United States Patent Office 2,774,902
Patented Dec. 18, 1956

2,774,902
ELECTROLUMINESCENT LAMP

Laurence Burns, Swampscott, Mass., assignor to Sylvania Electric Products Inc., Salem, Mass., a corporation of Massachusetts No Drawing. Application August 18, 1953,
Serial No. 375,055

3 Claims. (Cl. 313—108)

This invention relates to a lamp comprising two electrodes and a layer therebetween of an electroluminescent phosphor, that is, a phosphor capable of excitation by the application of a suitable electric field thereto, especially an alternating field.

Phosphors of this type are already known, but there are also other phosphors, which while responsive to ultraviolet and similar types of excitation, are not electroluminescent, or show only poor electroluminescence. In accordance with one embodiment of the present invention, such phosphors are made electroluminescent, or their electroluminescence greatly improved, by the addition of a small amount of substance which is ordinarily regarded as a "poison" or "killer" of luminescence, and especially of phosphorescence. Nickel, cobalt and iron are among the substances which can be so used, and the amount used is quite small, in order to prevent complete killing of the luminescence, being generally between about $10^{-4}$ and $10^{-5}$ percent by weight, although amounts as high as $10^{-3}$ percent can often be used.

The addition of such substances appears to reduce the number of very deep electron traps in the phosphor, thereby reducing the number of electrons which will be held in such traps and allowing a larger number of electrons to take part in the excitation and recombination processes in the phosphor. The amount of the "poison" added is small enough so that the formation of traps of more moderate or very small depth is not as greatly affected. The presence of the latter kinds of traps appear to be helpful to electroluminescence in some cases, possibly by increasing the field in the region of the traps, and possibly also because the conditions favorable to the formation of such traps are also favorable to the formation of donor or acceptor centers in the phosphor. The presence of lead in zinc sulfide phosphor, for example, has such an effect.

The number and kind of traps present has considerable effect on the electroluminescence of phosphors, and a nice balance among them is necessary.

For example, air-fired copper-activated zinc sulfide of the hexagonal crystal type containing some chlorine is only very dimly electroluminescent, although it may be brightly fluorescent or phosphorescent. The addition of a small amount of nickel or similar phosphorescence poison will make it more brightly electroluminescent.

The addition of a very small amount of nickel or similar material will decrease the frequency dependence of the green emission of a cubical zinc sulphide phosphor, containing lead, copper and chlorine. Hexagonal zinc sulfide, copper-activated but substantially free of chlorine or lead, gives a dim red electroluminescence with alternating fields of 60 cycles per second, the brightness being greater at higher frequencies. However, the addition of a small amount of nickel or the like will greatly increase the luminescence.

Similar effects are obtained with zinc or cadmium silicates, manganese-activated, and with other phosphors having deep traps or long phosphorescence.

In one embodiment of the invention, a phosphor is made by first mixing the following ingredients in finely powdered form in the proportions indicated:

| | Grams |
|---|---|
| ZnS (containing 2% $ZnCl_2$) | 1850 |
| CuO | 1.6 |
| $PbCO_3$ | 21.4 |
| $NiCO_3$ | 0.0002 |

If firing is done under conditions which result in loss of nickel, more should be used in the mixture above. If desired, about 80 grams of zinc oxide can also be added to the above mixture, to facilitate the preparation. Other copper, lead and nickel salts can be used instead of those shown; compounds such as the oxides, or compounds reducible to the oxides, being especially satisfactory. Chlorides and other halides are also useful in that respect. The lead can be omitted if the mixture is fired at a temperature above about 1000° C., and substances such as bismuth, antimony, arsenic and the like, or thallium, in appropriate compounds such as the oxides can be used instead of lead below about 1000° C.

The mixture is fired in air in an open silica or porcelain crucible, or in a crucible with the usual loosefitting cover, for about ten minutes at 1200° C. Better phosphors will generally be obtained, however, if the mixture is first heated for five minutes, then reground and refired for another five minutes. After each firing in any case, the top layer of the fired mixture is removed, and the particles in the lower layers used, as they will be found to be more uniform. After firing, the phosphor is washed in dilute acetic acid or other suitable bath, as shown in application Serial No. 180,783, filed August 22, 1950, by Elmer C. Payne, or application Serial No. 230,713 filed June 8, 1950, by Keith H. Butler and Horace H. Homer, now Patent No. 2,728,730.

If the zinc sulfide used in the preceding example is substantially chloride-free, the lead carbonate and nickel carbonate omitted, and the firing done in an atmosphere of hydrogen sulfide, the resulting phosphor will luminesce red. This phosphor is washed in a dilute aqueous solution of sodium cyanide after firing, the usual personal precautions being taken in the handling of the cyanide because of its deadly nature.

The phosphor so made has been described in the Journal of the Optical Society, volume 42, Number 12, December 1952, page 982. The luminescence is described as weak to medium bright, the weak luminescence presumably being at alternating fields of 60 cycles per second, the medium bright at much higher frequencies.

The addition of nickel to such phosphors in small amounts of the magnitude previously mentioned removes the deep traps and increases the luminescence, the increase being especially marked at low frequencies of the order of 60 cycles per second.

Although zinc phosphors have been described in the examples, phosphors of other metals can be used, for example of calcium or cadmium, and other compounds than sulfides can be used, for example, selenides, tellurides and silicates, and other activators than copper can be used, for example manganese. The latter activator will be especially effective when a silicate is used, with tin also present as in copending application Serial No. 326,586 filed December 17, 1952, by Keith H. Butler and Richard M. Rulon.

When manganese-activated zinc silicate containing a small amount of arsenic is used, the phosphorescence-killing materials are especially helpful, because of the deep traps caused by the arsenic.

Although nickel, cobalt and iron have been mentioned in the foregoing description, other "poisons" or "killers" of phosphorescence can be used, for example, chromium.

When the phosphor used is zinc sulfide, the amount of copper used will generally be between about 0.0002 and 0.0015 gram-atoms per mol of zinc sulfide for best results. The amount of lead added can be between about 0.0002 and 0.008 gram-moles per mole of zinc sulfide, although ordinarily only about 0.01% to 0.001% by weight of lead will be retained in the phosphor after firing and washing. This corresponds to about 0.0000005 to 0.00005 gram-atoms of lead per mole of zinc sulfide.

The manufacture of electroluminescent phosphors using arsenic, antimony and bismuth instead of lead in sulfide phosphors is described in copending application Serial No. 348,574, filed April 13, 1953, by Keith H. Butler and Laurence Burns. The use of lead in electroluminescent sulfide phosphors is shown by Keith H. Butler in application Serial No. 230,711, filed June 8, 1951, now Patent No. 2,745,811, which also shows the addition of manganese.

What I claim is:

1. An electroluminescent lamp comprising two electrodes and a layer therebetween of a copper-activated zinc sulfide electroluminescent phosphor containing from about $10^{-4}$ to about $10^{-5}$ percent by weight of a substance selected from the group consisting of nickel, cobalt and iron, the copper activator being present in amount between 0.0002 and 0.0015 gram atoms per mole of zinc sulfide.

2. An electroluminescent lamp comprising two electrodes and a layer therebetween of a hexagonal copper-activated zinc sulfide electroluminescent phosphor containing from about $10^{-4}$ to about $10^{-5}$ percent by weight of a substance selected from the group consisting of nickel, cobalt and iron.

3. An electroluminescent lamp comprising two electrodes and a layer therebetween of a hexagonal electroluminescent zinc sulfide phosphor consisting essentially of chloride-free zinc sulfide with a copper activator and from about $10^{-4}$ to about $10^{-5}$ percent by weight of a substance selected from the group consisting of nickel, cobalt and iron.

References Cited in the file of this patent

UNITED STATES PATENTS

| | | |
|---|---|---|
| 2,447,322 | Fonda | Aug. 7, 1948 |
| 2,615,849 | Markoski | Oct. 28, 1952 |
| 2,660,566 | Froelich | Nov. 24, 1953 |

FOREIGN PATENTS

| | | |
|---|---|---|
| 868,036 | Germany | Feb. 23, 1953 |
| 875,976 | Germany | May 7, 1953 |

OTHER REFERENCES

Journal of Electrochemical Society, Aug. 1953, vol. 100, No. 8, pp. 356–375.